US011815456B2

(12) United States Patent
Cui (10) Patent No.: US 11,815,456 B2
(45) Date of Patent: Nov. 14, 2023

(54) LINE SCANNING MECHANICAL STREAK SYSTEMS AND METHODS FOR PHOSPHORESCENCE LIFETIME IMAGING

(71) Applicant: Purdue Research Foundation, West Lafayette, IN (US)

(72) Inventor: Meng Cui, West Lafayette, IN (US)

(73) Assignee: PURDUE RESEARCH FOUNDATION, West Lafayette, IN (US)

(*) Notice: Subject to any disclaimer, the term of this patent is extended or adjusted under 35 U.S.C. 154(b) by 146 days.

(21) Appl. No.: 17/445,945

(22) Filed: Aug. 25, 2021

(65) Prior Publication Data

US 2022/0065783 A1   Mar. 3, 2022

Related U.S. Application Data

(60) Provisional application No. 63/070,177, filed on Aug. 25, 2020.

(51) Int. Cl.
*G01N 21/64* (2006.01)
*G06T 11/20* (2006.01)
*G06T 11/00* (2006.01)
*H04N 23/56* (2023.01)

(52) U.S. Cl.
CPC ........ *G01N 21/6408* (2013.01); *G06T 11/001* (2013.01); *G06T 11/206* (2013.01); *H04N 23/56* (2023.01); *G01N 2201/06113* (2013.01); *G01N 2201/1053* (2013.01)

(58) Field of Classification Search
CPC ..... G01N 21/6408; G01N 2201/06113; G01N 2201/1053; H04N 23/56; G06T 11/001; G06T 11/206
See application file for complete search history.

(56) References Cited

U.S. PATENT DOCUMENTS

2006/0187448 A1* 8/2006 Ye .................... G01N 21/6408
356/317
2017/0331990 A1* 11/2017 Heshmat Dehkordi ....................
H04N 23/56

OTHER PUBLICATIONS

Borck et al., "Microscope and Method for Optical Disc Fluorescence Microscopy", Jul. 13, 2017 (Year: 2017).*
(Continued)

*Primary Examiner* — David P Porta
*Assistant Examiner* — Fani Polyzos Boosalis (57) ABSTRACT

Systems and methods for analyzing samples, such as tissue samples, and measuring the emissions when these samples are exposed to light are disclosed. Embodiments include illuminating multiple target locations on a sample with laser light, which may first be manipulated by a scanner, and receiving decaying emissions from the target location. At least some embodiments include the emissions traveling backwards along a substantial portion of the laser light pathway and being received by a detector. Additional embodiments include converting the received emissions into streak lines of position versus time, converting the streak lines to plots of signal strength versus time, and curve fitting the plots to determine representative decay times. In some embodiments, the decay times are presented as plots of position on the surface of the sample versus emission strength, which may be color coded. Some embodiment dwell on each target location for multiple scans of the laser.

20 Claims, 6 Drawing Sheets

(56) References Cited

OTHER PUBLICATIONS

Chenmao Wang, et al.; "Line scanning mechanical streak camera for phosphorescence lifetime imaging", Optics Express vol. 28, No. 18; Aug. 31, 2020; 7 pages.
Eugene A Igel, et al.; "Rotating Mirror Streak and Framing Cameras", Published 1997.
Hideharu Mikami, et al.; "Ultrafast optical imaging technology: principles and applications of emerging methods", Nanophotonics; vol. 5, Issue 4; Published online Oct. 20, 2016; Published in Print: Sep. 1, 2016; 25 pages.

* cited by examiner

LINE SCANNING MECHANICAL STREAK SYSTEMS AND METHODS FOR PHOSPHORESCENCE LIFETIME IMAGING

This application claims the benefit of U.S. Provisional Application No. 63/070,177, filed Aug. 25, 2020, the entirety of which is hereby incorporated herein by reference.

GOVERNMENT RIGHTS

This invention was made with government support under MH120005, NS094341 and NS107689 awarded by the National Institutes of Health. The government has certain rights in the invention.

TECHNICAL FIELD

This disclosure relates to imaging and, in particular, to phosphorescence imaging.

BACKGROUND

Phosphorescence lifetime imaging plays an important role in material sciences and life sciences. In recent years the development of phosphorescence-based oxygen sensors has enabled in vivo studies of the microenvironment of biological systems. As the partial pressure of gases in blood holds great significance in many biomedical research disciplines such as neuroscience, stem cell, eye diseases and cancer, phosphorescence lifetime imaging in live biological tissue is becoming a widely employed research tool.

A common form of fluorescence lifetime imaging is based on point scanning and time domain detection with a fast sensor (e.g., single photon counting APD, PMT). Point scanning methods such as two-photon excited fluorescence imaging have the advances for imaging thick scattering tissue. Following three-dimensional ("3D") confined point excitation, all the emitted photons (ballistic and scattered) can be effectively collected by high etendue collection optics and detectors (e.g., PMT with large area and access solid angle). The inventor of the present disclosure realized that a drawback of using point scanning for phosphorescence lifetime imaging is that the emission lifetime is very long (often tens to hundreds of microseconds ($\mu s$)) and, therefore, on average each molecule's emission flux is very low. Bluntly increasing the laser focal intensity is unable to speed up the signal accumulation and is, instead, likely to cause photobleaching and measurement artifacts. For imaging less turbid and thinner tissue (e.g., cells and tissue culture, zebrafish larvae, eye), the parallel recording approach may be preferred. A simple adaption that may be employed is to, instead, use a photomultiplier tube (PMT) array detector. In addition to its high cost and low array count (much less than 100), such time-domain detectors are not suitable for accumulating weak signals due to the inherent detector noise. For example, with a few photons detected following each laser pulse excitation, it can take hundreds of readings to accumulate over 1,000 photons, which will aggregate the detector noise through hundreds of readout processes. Intensified cameras can offer a large number of pixels (approximately 1 million) for parallel detection. However, the inventor has realized that each frame is gated for a defined time point following the pulsed laser excitation. Therefore, it is highly lossy in the time domain.

It was realized by the inventor of the current disclosure that improvements in line scanning mechanical streak systems and methods, and in particular for phosphorescence lifetime imaging, are needed.

Certain preferred features of the present disclosure address these and other needs and provide other important advantages.

SUMMARY

Embodiments of the present disclosure provide an improved line scanning mechanical streak systems and methods for phosphorescence lifetime imaging.

In accordance with a first aspect of embodiments of the present disclosure, a system for phosphorescence lifetime imaging based on mechanical streaking is disclosed. The system may comprise a light source (which may be configured to excite phosphorescence emission), a detector (which may be a camera configured to receive the phosphorescence emission from a sample in response to the source emission), a slit, and/or a scanner (which may be a scanning mirror in view of the light source, the camera and/or the slit). In one embodiment, the scanning mirror reflects a phosphorescence emission passing back through the slit and directs it to the camera. In some embodiments, the system includes a processor configured to convert pixel position to time, perform exponential curve fitting to the recorded streak image, return the decay lifetime numbers, and/or perform said convert, perform and return features for each streak line and reduce a 2D streak image into a 1D phosphorescence lifetime image.

In accordance with another aspect of embodiments of the present disclosure, a method is disclosed, the method comprising the directing of a laser beam toward a first target location of a sample, exciting the first target location with the laser, receiving light energy from the first target location with a detector, the light energy being indicative of the excitation level of the first target location, and creating streak lines indicative of the time-dependent decrease in light energy due to the excitation decay of the first target location. In some embodiments the method includes determining a representative decay time for the streak line, and in some embodiment the method includes assigning a color to the representative decay time. Still further embodiments include presenting the decay time on a 2D plot representative of the location of the first target location on the sample and color coded depicting the decay time.

In accordance with still another aspect of embodiments of the present disclosure, a system comprising a laser light source, a scanner configured to direct a light beam generated by the laser light source to a plurality of target locations on a sample, means for directing energy indicative of the target decay of the plurality of target locations following illumination by the laser beam in the opposite direction along at least a portion of the laser beam pathway, and a detector configured to receive the energy indicative of the target decay of the plurality of target locations is disclosed. In some embodiments, means for converting the energy indicative of the target decay of the plurality of target locations and received by the detector into a representation for each target location of the sample reflecting the location of each target location on the sample and the decay time associated with each target location on the sample is also included.

This summary is provided to introduce a selection of the concepts that are described in further detail in the detailed description and drawings contained herein. This summary is not intended to identify any primary or essential features of the claimed subject matter. Some or all of the described features may be present in the corresponding independent or dependent claims, but should not be construed to be a limitation unless expressly recited in a particular claim.

Each embodiment described herein does not necessarily address every object described herein, and each embodiment does not necessarily include each feature described. Other forms, embodiments, objects, advantages, benefits, features, and aspects of the present disclosure will become apparent to one of skill in the art from the detailed description and drawings contained herein. Moreover, the various apparatuses and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

BRIEF DESCRIPTION OF THE DRAWINGS

Some of the figures shown herein may include dimensions or may have been created from scaled drawings. However, such dimensions, or the relative scaling within a figure, are by way of example, and not to be construed as limiting.

FIG. 2b is an emission lifetime trace from one pixel of the image depicted in FIG. 2a.

FIG. 3a is an example of lifetime image according to one embodiment of the present disclosure.

FIG. 3b is an emission lifetime trace from one pixel of the image depicted in FIG. 3a.

FIG. 4a is an example of lifetime image according to another embodiment of the present disclosure.

FIG. 4b is an emission lifetime trace from one pixel of the image depicted in FIG. 4a.

DETAILED DESCRIPTION OF THE ILLUSTRATED EMBODIMENTS

For the purposes of promoting an understanding of the principles of the disclosure, reference will now be made to one or more embodiments, which may or may not be illustrated in the drawings, and specific language will be used to describe the same. It will nevertheless be understood that no limitation of the scope of the disclosure is thereby intended; any alterations and further modifications of the described or illustrated embodiments, and any further applications of the principles of the disclosure as illustrated herein are contemplated as would normally occur to one skilled in the art to which the disclosure relates. At least one embodiment of the disclosure is shown in great detail, although it will be apparent to those skilled in the relevant art that some features or some combinations of features may not be shown for the sake of clarity.

Any reference to "invention" within this document is a reference to an embodiment of a family of inventions, with no single embodiment including features that are necessarily included in all embodiments, unless otherwise stated. Furthermore, although there may be references to benefits or advantages provided by some embodiments, other embodiments may not include those same benefits or advantages, or may include different benefits or advantages. Any benefits or advantages described herein are not to be construed as limiting to any of the claims.

Likewise, there may be discussion with regards to "objects" associated with some embodiments of the present invention, it is understood that yet other embodiments may not be associated with those same objects, or may include yet different objects. Any advantages, objects, or similar words used herein are not to be construed as limiting to any of the claims. The usage of words indicating preference, such as "preferably," refers to features and aspects that are present in at least one embodiment, but which are optional for some embodiments.

Specific quantities (spatial dimensions, temperatures, pressures, times, force, resistance, current, voltage, concentrations, wavelengths, frequencies, heat transfer coefficients, dimensionless parameters, etc.) may be used explicitly or implicitly herein, such specific quantities are presented as examples only and are approximate values unless otherwise indicated. Discussions pertaining to specific compositions of matter, if present, are presented as examples only and do not limit the applicability of other compositions of matter, especially other compositions of matter with similar properties, unless otherwise indicated.

Phosphorescence lifetime measurement holds great importance in life sciences and material sciences. Due to the long lifetime of phosphorescence emission, conventional approaches based on point scanning time-domain recording suffer from long recording time and low signal-to-noise ratio (SNR). To overcome these difficulties, we developed a line scanning mechanical streak camera for parallel and high SNR imaging. This design offers three key advantages. First, hundreds to thousands of pixels can be recorded simultaneously at high throughput. Second, hundreds of excitation can be accumulated on a single camera frame and read out at once with high quantum efficiency (QE) and low read noise. Third, the system is very simple, only requiring a camera and a scanner. Using a confocal line scanning configuration, we imaged samples of various lifetime ranging from tens of nanoseconds to hundreds of microseconds, which demonstrated the versatility and advantages of this method.

Figure 1:
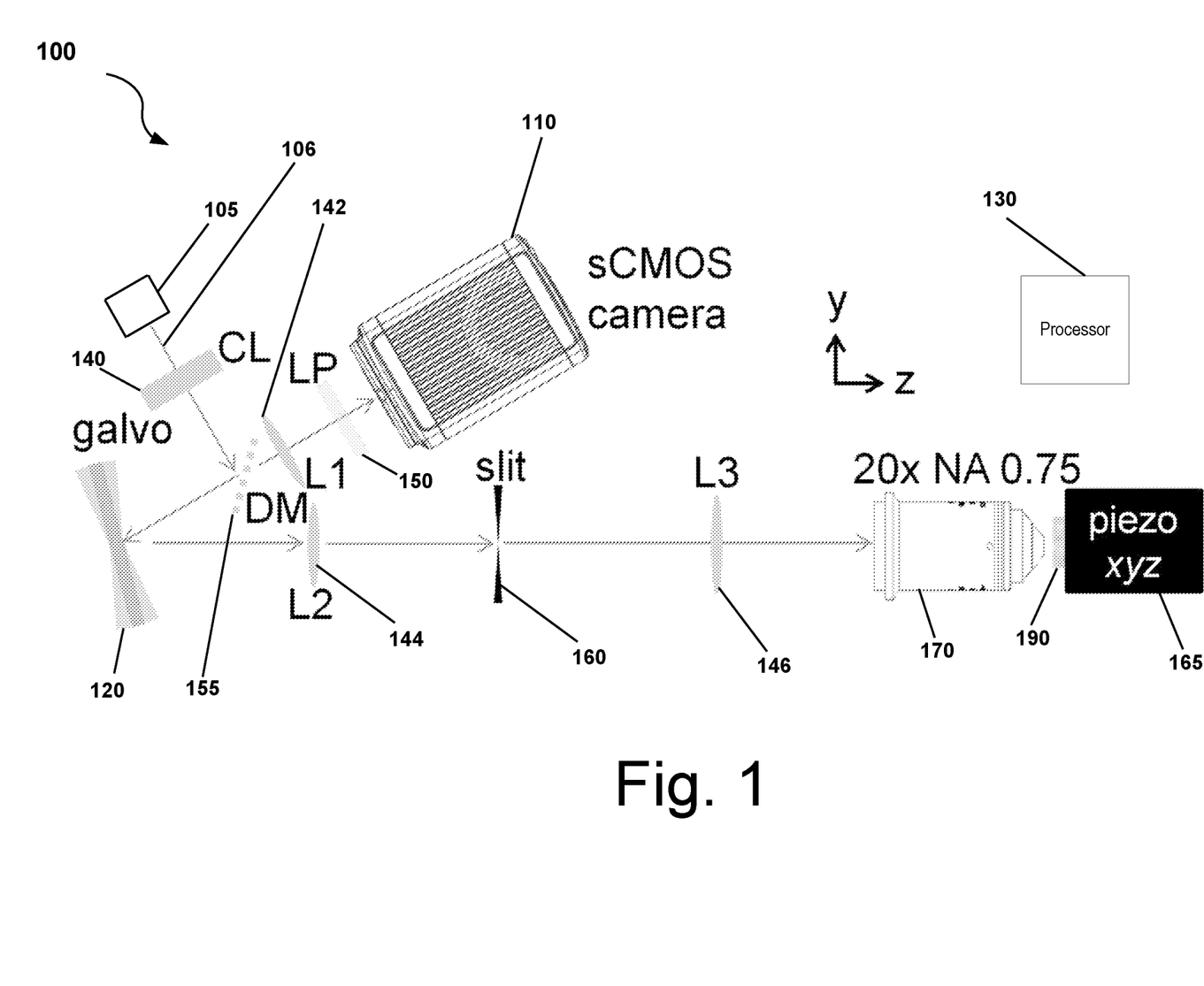
FIG. 1 is a schematic representation of an imaging system according to one embodiment of the present disclosure.

Illustrated in FIG. 1 is an example of a mechanical streaking-based lifetime imaging system 100. The system 100 includes a detector 110 (e.g., a camera). The camera 110 may include, for example, an sCMOS camera. The system 100 may utilize the camera 110 with mechanical streaking and line laser excitation to form a low-cost high-throughput low-noise phosphorescence lifetime imaging system. Mechanical streaking may be accomplished by utilizing a scanner 120 (e.g., a scanning mirror or a galvo scanner with a rotating reflective surface) to spread an optical beam (e.g., laser beam 105) to different angles. The speed sccd of the rotating reflective surface 120 can be less than that of the optoelectronic streak camera and still be more than enough for phosphorescence lifetime imaging.

The system 100 may include a scanner 120. By way of example, the scanner 120 may be a 5 mm, 26 optical degrees, 8 kHz resonant galvanometer ("galvo") scanner (e.g., CRS 8 kHz, Cambridge Technology). At the wavelength of 500 nanometers ("nm"), the angular optical mode is λ/d (0.1 milliradian ("mrad")) where λ is the optical wavelength and d is the galvo aperture. Over a scan range of 26 degrees, there can be 4,538 optical modes. At 8 kHz resonance, there can be an average line rate (bidirectional scan) of 16 kilohertz ("kHz"). So the average scan rate is 72.6 million ("M") mode/sec. With sinusoidal scanning, the ratio of the peak speed to the average speed is $\pi/2$. Therefore, the peak scanning speed can be 114 M mode/sec near the center of the scanning range. To satisfy the sampling limit, at least 228 M data points/sec is needed. Inversely, the sampling step size is approximately 4.4 nanoseconds ("ns") for embodiments with a single galvo single pass configuration, which is a bit slower for typical fluorescence lifetime measurement but more than sufficient for phosphorescence lifetime imaging.

For imaging, the system 100 may utilize a pulsed line excitation. The mechanical streaking will spread the subsequent phosphorescence emission onto a two-dimensional ("2D") sCMOS camera. Compared to PMT arrays, sCMOS sensors offer high QE (approximately 80%), low read noise (approximately 1 electron) and large format (simultaneous recording over 2,000 lines). More importantly, such a configuration allows the accumulation of weak emission signals over many pulsed excitations followed by single low-noise readout. Each readout of the camera frame completes the lifetime measurement for one line of the 2D image.

Figure 5:
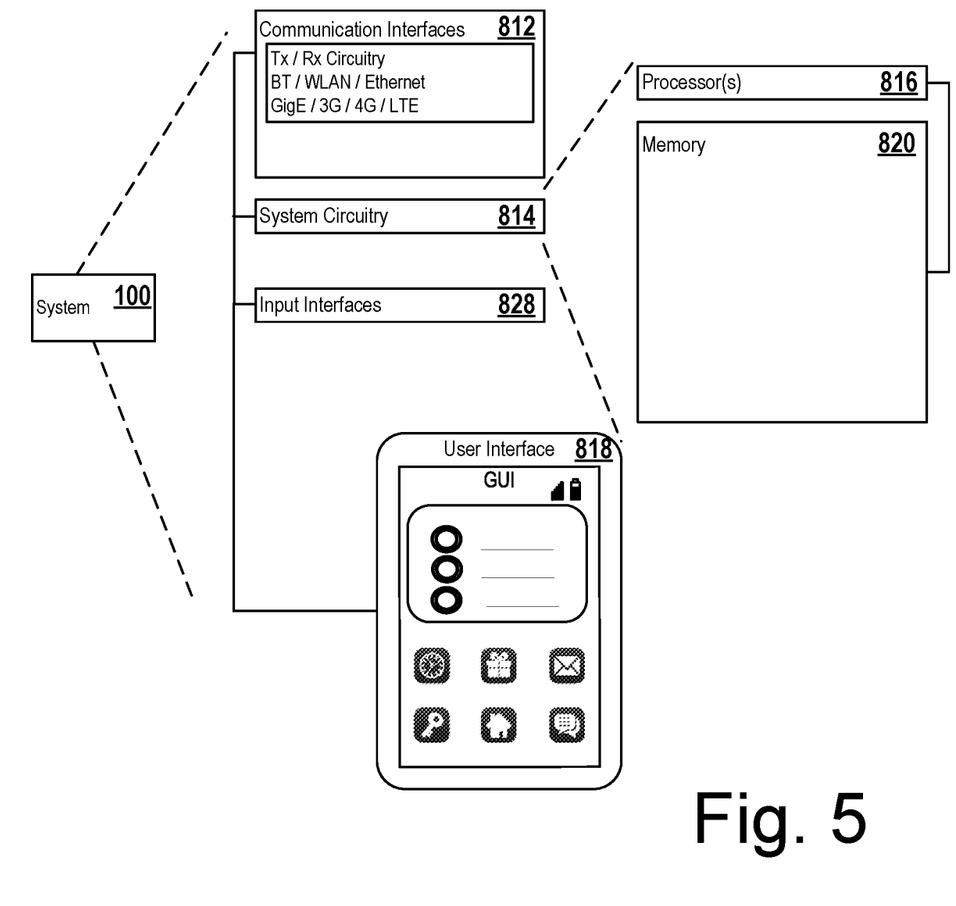
FIG. 5 is a schematic/block diagram of an imaging system according to another embodiment of the present disclosure.

The system 100 may include a processor 130 (one example being a processor 816 as depicted in FIG. 5) that translates the laser line position with respect to the sample to form 2D or even 3D lifetime images.

In various embodiments, the system 100 may include a light source 105 (e.g., a laser), a focusing lens 140 (e.g., a cylindrical lens (CL)), one or more relay lenses (for example, relay lenses L1-L3, which in some embodiments are telecentric relay lenses 142, 144 and 146), a filter 150 (e.g., a long-pass filter (LP)), a mirror 155 (e.g., a dichroic mirror (DM)), a slit 160, and a platform 165 for holding a sample 190 (e.g., a piezo stage).

The light source 105 may excite phosphorescence emission. The camera 110 may receive the phosphorescence emission from a sample 190. The scanning mirror 120 may be positioned in view of the light source 105, the camera 110, and the slit 160. The scanning mirror 120 may reflect the phosphorescence emission passing back through the slit 160 to the camera 110.

In one example embodiment, though not intended to limit other possible embodiments, the cylindrical lens 140 has a 500 millimeter (mm) focal length, the relay lenses 144 and 146 have focal lengths of 100, 100, and 300 mm, respectively, the long-pass filter 150 is a 600 nanometer (nm) long-pass filter, the dichroic mirror 155 is a 580 nm long-pass dichroic mirror, the slit is an adjustable mechanical slit (such as VA100, Throlabs), and the piezo stage 165 may be a 3-axis piezo stage (such as Nano-OP100, MCL). While some embodiments include all of these features, other embodiment include less than all (such as, one or more) of these features.

The system 100 may, among other operations, convert pixel positions of the recorded streak image to time, perform curve fitting (e.g., exponential curve fitting) to the recorded streak image and/or return the decay lifetime numbers. The system 100 may perform these operations for each streak line, which may be used to reduce a 2D streak image into a one-dimensional ("1 D") phosphorescence lifetime image (e.g., assigning a color to the data represented by the streak line as discussed below).

In some embodiments, the system 100 performs lifetime-based imaging with a line confocal imaging (LCI) configuration. A collimated continuous wave (cw) laser beam 106 may be focused by a cylindrical lens 140 onto, for example, a dichroic mirror 155 that may direct the focused beam 106 onto a single-axis galvo scanner 120. The horizontal line shaped focus (on the yz plane, which his depicted in FIG. 1, may be positioned precisely on the surface of the mirror of the galvo scanner 120. A telecentric relay lens 144 may convert the beam reflected from the galvo mirror into a vertical line along the xz plane, which may then travel through the adjustable vertical slit 160. Another telecentric relay lens 146 and an objective lens 170 may image the slit 160 onto the sample 190, which may be supported by a 3-axis piezo stage 165. The emitted phosphorescence signal may travel backward through the slit 160 and be subsequently imaged by telecentric relay lens 144 and telecentric relay lens 142 onto the sCMOS camera (e.g., a C11440-22CU, Hamamatsu). Since, in some embodiments, the galvo scanner 120 is in constant motion, the phosphorescence emission through the slit 160 is spread onto a 2D image resulting in mechanical streaking. Following image capture and readout by the camera, the sample may be translated (e.g., moved along the y axis and/or the z axis) using the piezo stage and another exposure may be started. The recording of the camera 110 readout over many lines forms a 2D image.

The system 100 described herein can greatly simplify lifetime measurement. First, the system 100 can provide the flexibility of using either pulsed lasers or cw lasers. With the galvo scanner in motion, the slit naturally performs the task of temporal illumination gating. Second, there is no need to precisely synchronize the laser illumination with the starting time of the detector 110. Instead, in some embodiments the only requirement is that the camera 110 exposure time is an integer number of the galvo scanner 110's half cycle time (two scans per cycle). Third, averaging repeated exposure becomes a trivial task in some embodiments as the camera 110 exposure time can be increased to capture more scanning cycles followed by a single readout.

The slit 160 may be positioned at the center of the galvo scanner 120's Field of View (FOV), which can also be imaged to the center of the sCMOS camera/sensor 110. Therefore, a scanning cycle can produce two streaking measurements on a single camera image, one half from center to left and the other half from center to right. Both images contain the same information. For better SNR, the image may be divided into two halves, flipped from left to right, and then recombined. Using FIG. 6 as an example, there are streak lines above and below the null ("0") axis, which indicates information gathered when the scanner is in its null position. The image in FIG. 6 can be essentially folded along the null position/axis to combine the data above the null axis with the data below the null axis, thereby increasing (approximately doubling) the signal (e.g., photons) collected at each position. For each streak line of the image, the data may be fitted with a single curve (e.g., an exponential function curve fit) to extract the decay lifetime.

Figure 2A:
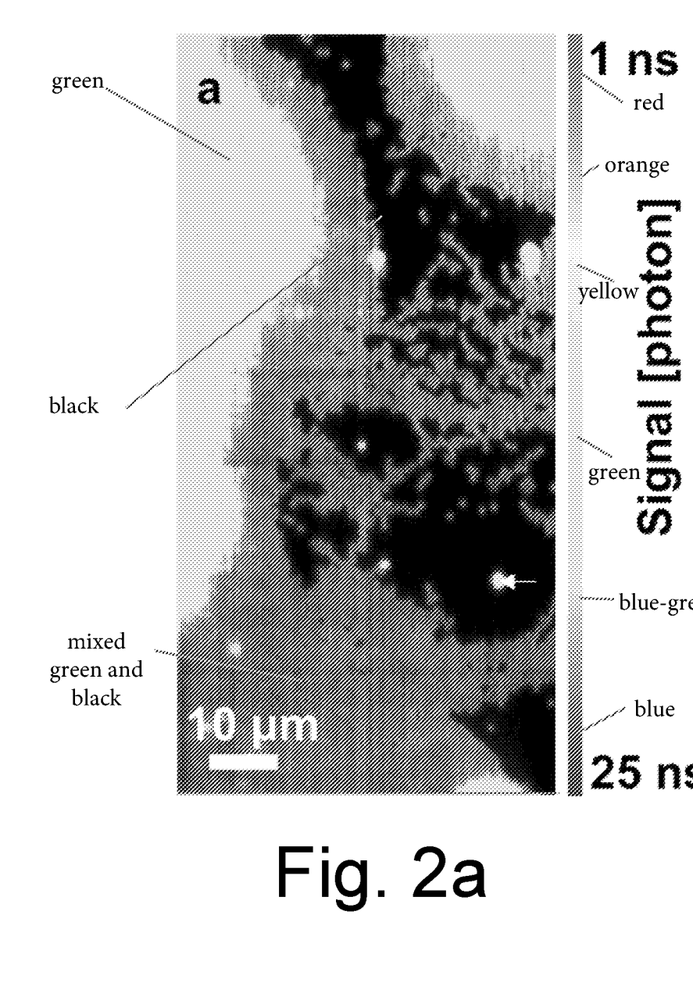
FIG. 2a is an example of a fluorescence lifetime image according to one embodiment of the present disclosure.
Figure 2B:
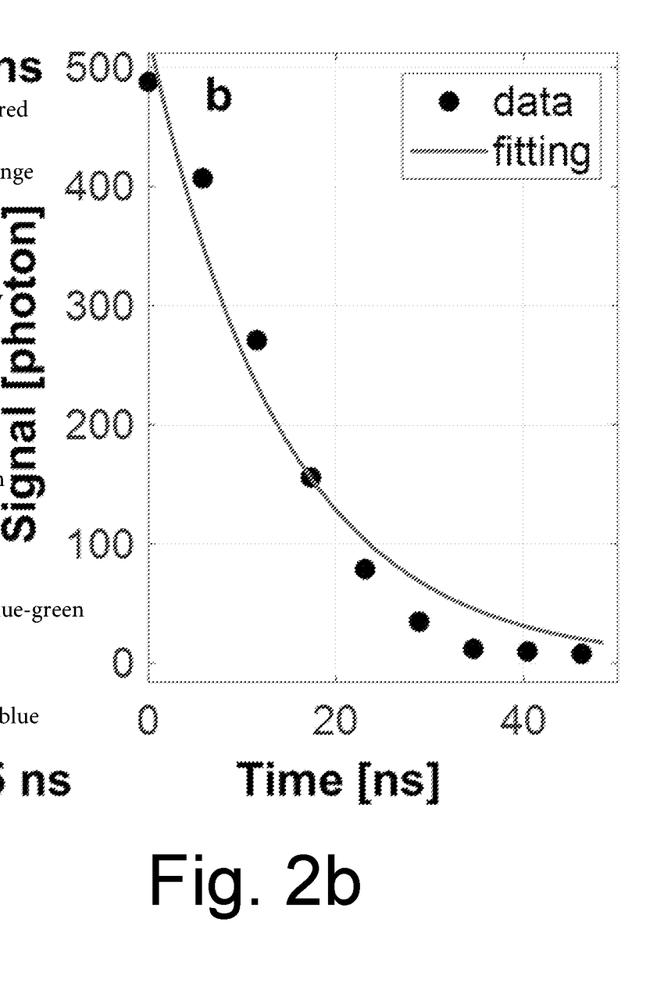

Illustrated in FIG. 2 is a system response test with 1 micrometer (μm) fluorescence beads (e.g., FluoSpheres F8821, ThermoFisher) as the sample and a 5 mm aperture resonant galvo running at 7.9 kHz with a scan range of 26 optical degrees was utilized. With a 100 mm lens 142 and a 6.5 μm pixel size considered, the streaking time across each pixel was 5.77 ns near the center of the scan range. For comparison, the synthetic dye typically has a lifetime of a few nanoseconds, which is faster than the response of system 100 in this example.

Figure 6:
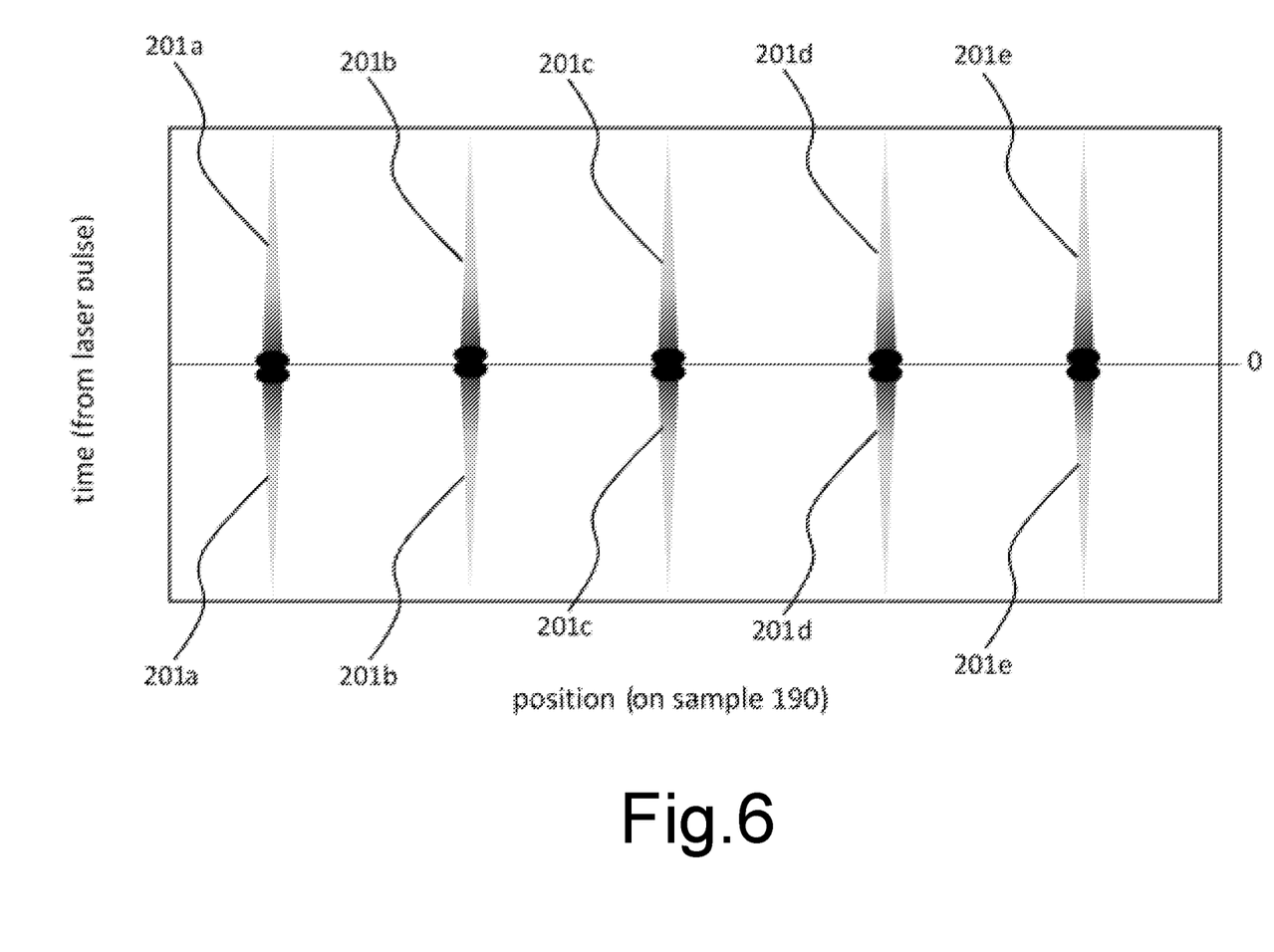
FIG. 6 is a graphical representation of a streak line plot according to one embodiment of the present disclosure.

To generate the information represented in FIGS. 2a and 2b the laser 105 is pulsed once for each scan of the galvo scanner 120. The camera 110 measures the return signal, which decays over time producing streak lines as shown in FIG. 6. The streak lines 201 represent the decay of the signal at different locations on sample 190, the darker portions indicating a stronger signal. When using a galvo scanner 120, streak lines will be created above and below the null ("0") axis since the reflective surface of the galvo scanner oscillates back-and-forth, the "back" scanning direction producing a streak above (or below) the null axis, and the "forth" scanning directing producing a streak below (or above) the null axis. In embodiments utilizing a polygonal lens scanner that constantly rotates and does not move back-and-forth, the streak lines will all be on the same side of the null axis in FIG. 6.

Since the speed that scanner 120 is scanning and the target position are known, the pixel positions of the recorded streak lines can be converted to time (time×speed=position; therefore, time=position/speed) in order to analyze the decay times. The first target location on the sample 190 (e.g., the target location corresponding to streak lines 201a) is changed, either by moving the sample (such as by using the piezo platform 165) and/or by redirecting the laser (such as by using mirrors), and additional streak lines are generated at the new target location(s) on the sample 190 (e.g., target locations associated with streak lines 201b, 201c, 201d, 201e, etc.). By keeping the target location on the sample 190 constant for multiple pulses of laser 190, multiple streak lines are superposed over one another creating a streak line with more signal (e.g., more photons) than if the streak line were generated with only a single laser pulse. In practice, a user can use a particular exposure time and determine if there is sufficient signal (e.g., if there are sufficient photons) for analysis (e.g., curve fitting). If there are an insufficient photons, the exposure time for each target position on sample 190 can be easily increased and the sample 190 scanned again to produce streak lines with sufficient data points.

The streak lines 201 are analyzed to determine the representative decay time for each streak line, which corresponds to a target location, on the sample 190. The decay signal of a streak line can be represented by a data plot as indicated by the individual data points in FIG. 2b. An example representation of the return signal is depicted in FIG. 2b. The more samples (laser pulses) are taken at the same target location before moving to a new target location, the more data points will be present in the streak line 201 for that target location. Curve fitting (e.g., exponential curve fitting) can produce a representative decay time for that target location. Once the decay time is known for a particular target location, a color representing the decay time can be assigned to that particular position and the color associated with that position can be plotted on a 2D figure creating a graphical representation of decay times over the entire sample as shown in FIG. 2a. Since the x and y axes of FIG. 2a represent locations on the sample 190 and the color represents the time decay of that location, FIG. 2a presents a 3D representation of the sample 190.

Turning to the example data shown in FIG. 2a, when the position on the surface of the sample 190 represented by the information designated by the white arrow (in the lower right quadrant of FIG. 2a) was excited by the laser, the decay time was calculated (see, FIG. 2b) as approximately 14 nanoseconds (ns). 14 nanoseconds was assigned a green color, so the position on FIG. 2a denoted with the white arrow was plotted as green. If the decay time had been close to 1 ns the plot point would have been red in color, and if the decay time had been approximately 25 ns the plot point would have been blue in color. The color scheme of the FIG. 2b legend with 1 ns at the top and 25 ns at the bottom begins with red for 1 ns then changes through orange, yellow, green, and then blue at 25 ns. In this example embodiment, the image in FIG. 2a was built from left to right and from top to bottom, although other embodiments may be implemented to build images in any desired direction, e.g., left to right and bottom to top, right to left and top to bottom, etc.

Since the sample (fluorescence beads) used to generate FIGS. 2a and 2b had very fast decay times (around 1-2 ns, and typically faster than the response time of system 100), the data in FIG. 2a plotted as either green or black, i.e., there was either a response (green, indicating the presence of fluorophore) or there was no response (black, indicating the absence of fluorophore), which resulted in a fairly monochromatic plot image. The samples used to generate FIG. 3a/3b and FIG. 4a/4b were a PtOEP cluster and a europium luminescent microsphere cluster, respectively, which had slower response times, the resulting plots included many more colors.

Measuring fast decaying beads allowed the quantification of the system's response. A 532 nm 200 mW cw fiber laser (MPB Communications) was used. Even with the wavelength of the laser 105 being far from the peak excitation wavelength (580 nm) of the beads, the beads had strong emission. The averaged laser excitation power for each pixel was 0.43 nanowatts (nW) and the exposure time for each camera frame was 10 ms.

FIG. 2a depicts an example fluorescence lifetime image of the beads with a FOV of 55×110 square micrometers ($\mu m^2$). The total image for recording time depicted in FIG. 2a was 2.56 sec (256 vertical lines). FIG. 2b depicts the emission lifetime trace from one pixel of the image depicted in FIG. 2a. The one pixel is in the lower right quadrant of FIG. 2a and is indicated with a white arrow. Exponential fitting shows a lifetime of approximately 14 ns. This information suggests that the system is fast enough for measuring the typical phosphorescence lifetime (tens of nanoseconds to hundreds of microseconds).

Figures 3A, 3B:
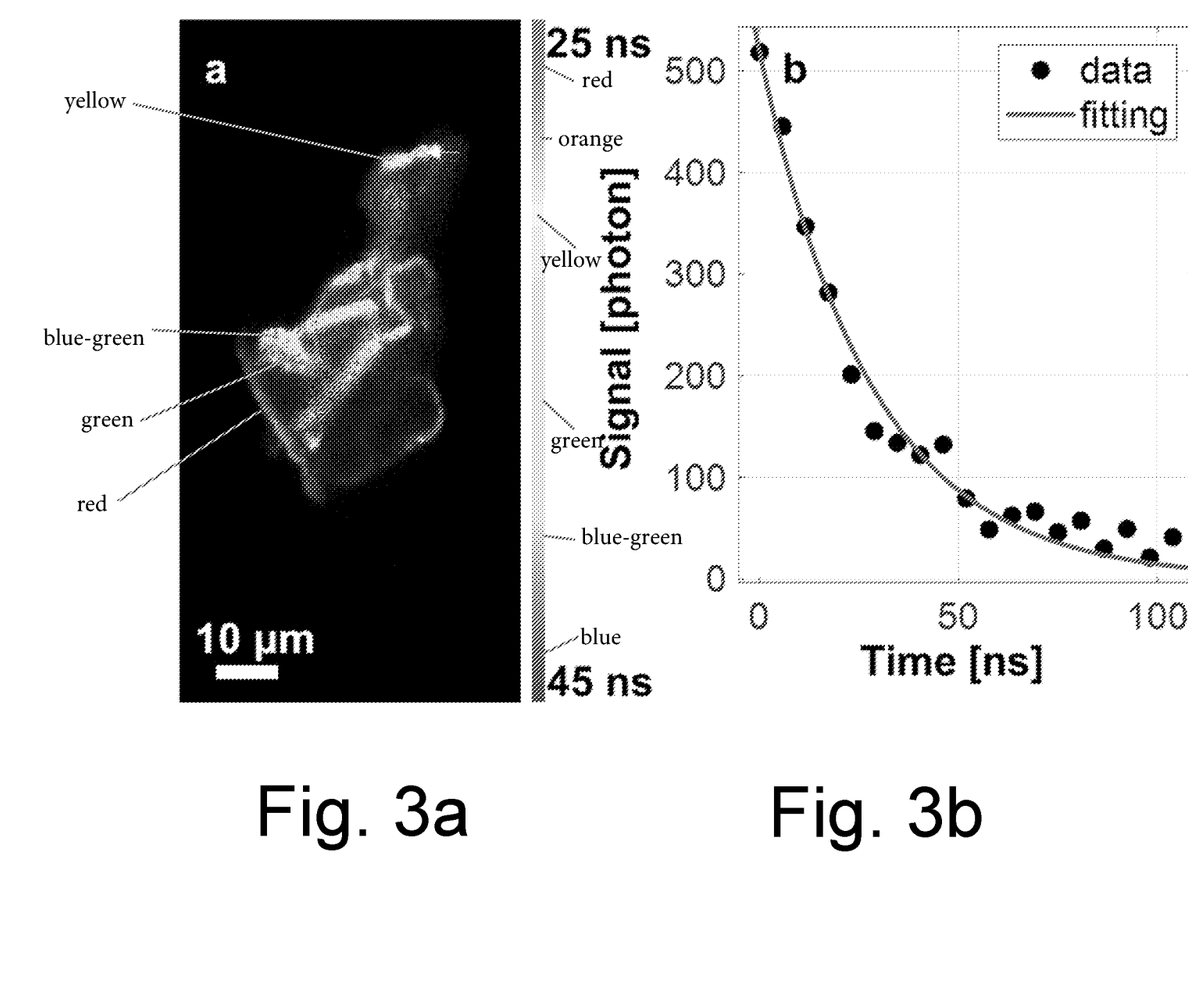

Illustrated in FIG. 3 is a system response test with clusters of platinum-octaethyl-porphyrin (PtOEP, Exciton) which had been explored as an organic light emitting diode material. PtOEP powder was dissolved in toluene and the solution was dried on glass slide. A procedure of illuminating target locations on sample 190, measuring the return signal with camera 110, generating streak lines, determining a representative decay time by curve fitting the data in the streak lines, assigning color coding to the representative decay times, and plotting the color-coded decay times in a manner similar to that described above in relation to FIGS. 2a & 2b were used to generate FIGS. 3a & 3b.

The clusters of PtOEP were imaged using an excitation wavelength of 532 nm. The average excitation power was 16 nW per pixel and the camera exposure time was 100 ms. The total recording time for the image with 256 vertical lines was 25.6 seconds.

FIG. 3a depicts an example lifetime imaging of a PtOEP cluster on a glass slide with a FOV of 55×110 $\mu m^2$. FIG. 3b depicts the emission lifetime trace from one pixel of the image depicted in FIG. 3a. The one pixel is in the upper right quadrant of FIG. 3a and is indicated with a white arrow. Exponential fitting shows a lifetime of approximately 28 ns.

Figures 4A, 4B:
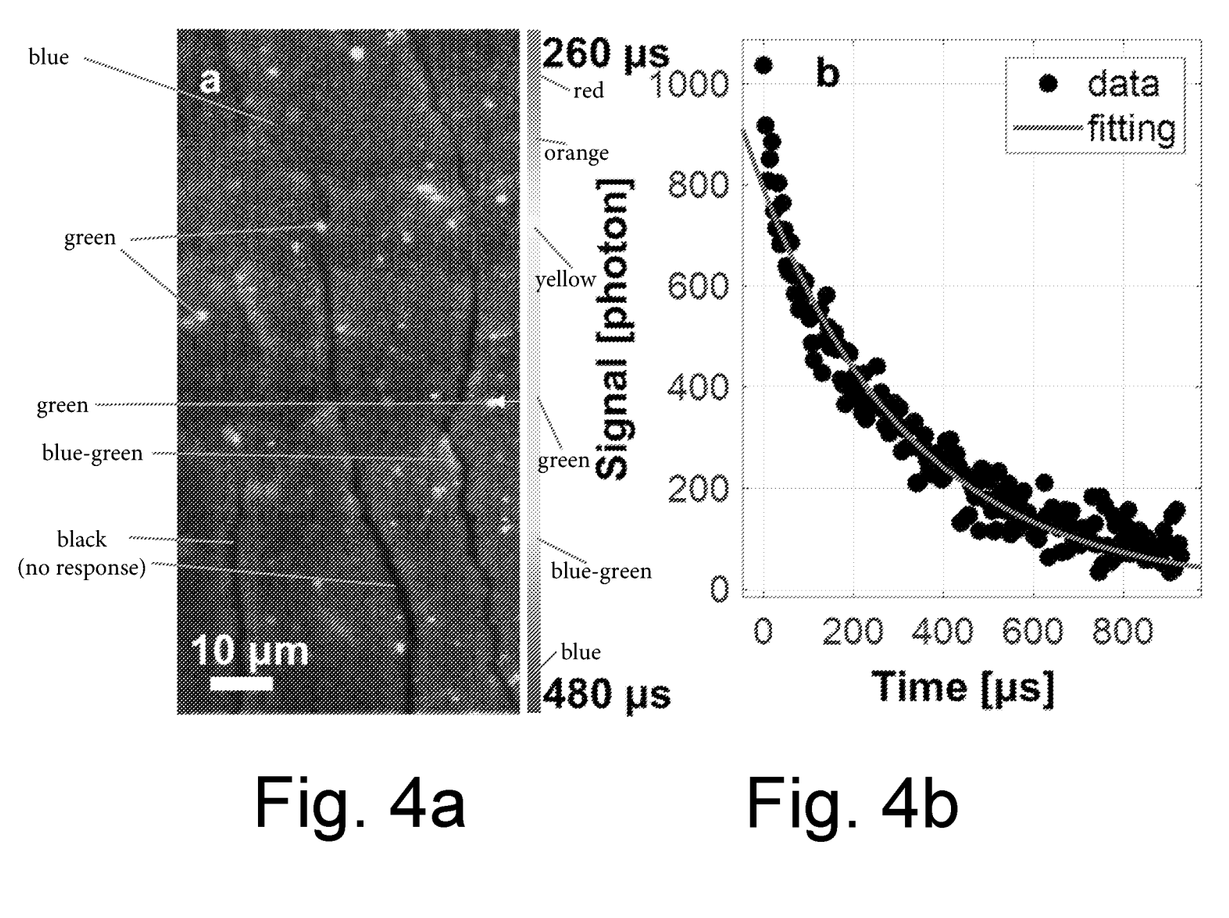

An example of the system 100 was also used for imaging of long emission lifetime molecules. Experimentally, europium luminescent microspheres (FluoSpheres F20881, ThermoFisher) were air dried 0.2 $\mu m$ on a glass slide. To accommodate the hundreds of microseconds decay time, a 5 mm non-resonant galvo scanner (8315k, Cambridge Technology) was used. The galvo was driven with a 100 Hz symmetric saw tooth signal with a scan range of 4 optical degrees, which resulted in a streaking time of 4.66 $\mu s$ per pixel. The absorption peak of the europium luminescent microspheres was 365 nm. A 405 nm cw diode laser (50 mW CUBE 405, Coherent) was utilized as the excitation source. Due to wavelength mismatch, the emission was rather weak. The average excitation power was 40 nW per pixel and the camera exposure time was 500 ms which effectively accumulated 100 decay traces within a single exposure. The overall recording time for an image with 256 vertical lines was 128 seconds.

The tens of nW per pixel average power level shows that the line scanning mechanical streak camera based lifetime imaging is particularly useful for using low level illumination to accumulate weak emission signals over many excitation cycles. As the sCMOS camera 110's read noise was only approximately 1 electron and the dark noise was much less than 1 electron per second, the image recording was very clean, dominated by the shot noise. This is a distinct advantage over PMT based time domain measurement. For example, the signal at approximately 100 ns delay in FIG. 3(*b*) contained approximately 30 photons, which was accumulated over approximately 1600 excitation cycles (100 ms). If PMT arrays were used, the signal would contain substantial detector noise aggregated over approximately 1600 excitation cycles and the signal would also be weaker due to PMT's lower QE. Moreover, the common PMT array detectors contain only tens of detector channels. In comparison, sCMOS offers above 2,000 lines for parallel recording.

The maximum throughput of the mechanical streak design can be limited by the sCMOS camera (approximately 0.5-1.5 G pixels/sec). Modern camera architecture allows great flexibility in increasing frame rate at the cost of column number without affecting the overall data throughput. For phosphorescence measurement, this feature allows using the minimum number of time sampling pixels to achieve the maximum lifetime imaging line rate.

A single galvo can scan both the excitation beam and the emission beam. With the slit aperture, it is possible to use cw lasers for lifetime recording even though their power usage efficiency is typically lower than that of pulsed laser sources as the excitation beam was blocked by the slit during the phosphorescence recording. However, as cw laser sources are widely available (e.g., as seen in common confocal microscopy and light sheet imaging systems) and often offer greater flexibility in power and wavelength selection, such a design can greatly facilitate the adoption of phosphorescence lifetime imaging.

Depicted in FIG. 4*a* is an example lifetime imaging of an europium luminescent microsphere cluster on glass slide with a FOV of 55×110 μm². FIG. 4*b* depicts the emission lifetime trace from one pixel of the image depicted in FIG. 4*a*. The one pixel is in the right center of FIG. 2*a* and is indicated with a white arrow. Exponential fitting shows a lifetime of approximately 340 μs. A procedure of illuminating target locations on sample 190, measuring the return signal with camera 110, generating streak lines, determining a representative decay time by curve fitting the data in the streak lines, assigning color coding to the representative decay times, and plotting the color-coded decay times in a manner similar to that described above in relation to FIGS. 2*a* & 2*b* were used to generate FIGS. 4*a* & 4*b*.

In an experiment where a single slit 160 was utilized, scanning the beam across in one direction produced a single illumination and lifetime trace. In some embodiments where increased throughput and efficiency may be desirable, multiple parallel slits (e.g., created by photolithography) and multiple laser lines (e.g., generated by diffractive optics) may be used. Even in an example where the system uses 100 sampling points for a lifetime trace, the system would be able to record at least 20 spatially separated lines on a single sCMOS frame. For resonant galvo based measurement, the scanning path across the entire FOV is a sinusoidal function of time. For applications that will use larger portions of the FOV (e.g., the multi-slit multi-line excitation configuration), the system may convert the pixel to time based (using similar techniques as described above) on the sinusoidal function before executing the exponential curve fitting.

Advantages realized by embodiments of the present disclosure include the ability to analyze samples (e.g., tissue samples) and measure the emissions (e.g., phosphorescence emissions) when these samples are exposed to light (e.g., laser light) at very low cost. Additional advantages of embodiments include the ability to produce data with dramatically increased signal to noise ratios (SNRs) since with these systems and methods it is very simple to accumulate more data (e.g., photons) for each target location of a sample by simply dwelling on that target location for a longer period.

Embodiments of the systems and methods disclosed herein may be implemented in many ways with the experimental results serving as illustrative examples of the technical advancements provided by the systems and methods described herein. Towards high-throughput parallel detection, the system can provide a line scanning mechanical streak camera-based phosphorescence lifetime imaging. Using a confocal line detection configuration, the system may image samples with emission lifetime ranging from tens of nanoseconds to hundreds of microseconds. One advantage over common time domain detector based recording is the capability of accumulating weak signals through many excitation cycles followed by a single readout, which is particularly important for imaging long lifetime phosphors or other targets with inherently low emission photon flux. The capability to work with low excitation laser power is advantageous for life science applications. In addition to confocal line imaging, these systems and methods can be adapted for line scanning light sheet imaging. As new generations of sCMOS camera technologies are offering improved QE, noise level, format, throughput and cost, the line scanning mechanical streak design will be highly valuable to a broad range of applications.

The systems and methods disclosed herein may be implemented with additional, different, or fewer components than illustrated. Each component may include additional, different, or fewer components.

FIG. 5 illustrates a second example of the system 100. The system 100 may include communication interfaces 812, input interfaces 828 and/or system circuitry 814 in addition to one or more elements of system 100 described previously (e.g., described in relation to FIG. 1). The system circuitry 814 may include a processor 816 or multiple processors. Alternatively or in addition, the system circuitry 814 may include memory 820.

The processor 816 may be in communication with the memory 820. In some examples, the processor 816 may also be in communication with additional elements, such as the communication interfaces 812, the input interfaces 828, and/or the user interface 818. Examples of the processor 816 may include a general processor, a central processing unit, logical CPUs/arrays, a microcontroller, a server, an application specific integrated circuit (ASIC), a digital signal processor, a field programmable gate array (FPGA), and/or a digital circuit, analog circuit, or some combination thereof.

The processor 816 may be one or more devices operable to execute logic. The logic may include computer executable instructions or computer code stored in the memory 820 or in other memory that when executed by the processor 816, cause the processor 816 to perform the operations of the system 100. The computer code may include instructions executable with the processor 816.

The memory 820 may be any device for storing and retrieving data or any combination thereof. The memory 820 may include non-volatile and/or volatile memory, such as a random access memory (RAM), a read-only memory (ROM), an erasable programmable read-only memory (EPROM), or flash memory. Alternatively or in addition, the memory 820 may include an optical, magnetic (hard-drive), solid-state drive or any other form of data storage device.

The system 100 may be implemented in many different ways. In some examples, the system 100 may be implemented with one or more logical components. For example, the logical components of the system 100 may be hardware or a combination of hardware and software. The logical components may include any component or subcomponent of the system 100. In some examples, each logic component may include an application specific integrated circuit (ASIC), a Field Programmable Gate Array (FPGA), a digital logic circuit, an analog circuit, a combination of discrete circuits, gates, or any other type of hardware or combination thereof. Alternatively or in addition, each component may include memory hardware, such as a portion of the memory 820, for example, that comprises instructions executable with the processor 816 or other processor to implement one or more of the features of the logical components. When any one of the logical components includes the portion of the memory that comprises instructions executable with the processor 816, the component may or may not include the processor 816. In some examples, each logical component may just be the portion of the memory 820 or other physical memory that comprises instructions executable with the processor 816, or other processor(s), to implement the features of the corresponding component without the component including any other hardware. Because each component includes at least some hardware even when the included hardware comprises software, each component may be interchangeably referred to as a hardware component.

Some features are shown stored in a computer readable storage medium (for example, as logic implemented as computer executable instructions or as data structures in memory). All or part of the system and its logic and data structures may be stored on, distributed across, or read from one or more types of computer readable storage media. Examples of the computer readable storage medium may include a hard disk, a flash drive, a cache, volatile memory, non-volatile memory, RAM, flash memory, or any other type of computer readable storage medium or storage media. The computer readable storage medium may include any type of non-transitory computer readable medium, such a volatile memory, a non-volatile memory, ROM, RAM, or any other suitable storage device.

The processing capability of the system may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may be implemented with different types of data structures such as linked lists, hash tables, or implicit storage mechanisms. Logic, such as programs or circuitry, may be combined or split among multiple programs, distributed across several memories and processors, and may be implemented in a library, such as a shared library (for example, a dynamic link library (DLL).

All of the discussion, regardless of the particular implementation described, is illustrative in nature, rather than limiting. For example, although selected aspects, features, or components of the implementations are depicted as being stored in memory(s), all or part of the system or systems may be stored on, distributed across, or read from other computer readable storage media, for example, secondary storage devices such as hard disks and flash memory drives. Moreover, the various logical units, circuitry and screen display functionality is but one example of such functionality and any other configurations encompassing similar functionality are possible.

The respective logic, software or instructions for implementing the processes, methods and/or techniques discussed above may be provided on computer readable storage media. The functions, acts or tasks illustrated in one or more figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one example, the instructions are stored on a removable media device for reading by local or remote systems. In other examples, the logic or instructions are stored in a remote location for transfer through a computer network or over telephone lines. In yet other examples, the logic or instructions are stored within a given computer and/or central processing unit ("CPU").

Furthermore, although specific components are described above, methods, systems, and articles of manufacture described herein may include additional, fewer, or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same apparatus executing a same program or different programs. The components may be resident on separate hardware, such as separate removable circuit boards, or share common hardware, such as a same memory and processor for implementing instructions from the memory. Programs may be parts of a single program, separate programs, or distributed across several memories and processors.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

Reference systems that may be used herein can refer generally to various directions (e.g., upper, lower, forward and rearward), which are merely offered to assist the reader in understanding the various embodiments of the disclosure and are not to be interpreted as limiting. Other reference systems may be used to describe various embodiments, such as referring to the direction of projectile movement as it exits the firearm as being up, down, rearward or any other direction.

While examples, one or more representative embodiments and specific forms of the disclosure have been illustrated and described in detail in the drawings and foregoing description, the same is to be considered as illustrative and not restrictive or limiting. It will be apparent to those of ordinary skill in the art that many more embodiments and implementations are possible. The embodiments described herein are examples, not the only possible embodiments and implementations. The description of particular features in one embodiment does not imply that those particular features are necessarily limited to that one embodiment. Some or all of the features of one embodiment can be used or applied in combination with some or all of the features of other embodiments unless otherwise indicated.

Element Numbering

Table 1 includes element numbers and at least one word used to describe the member and/or feature represented by the element number. It is understood that none of the embodiments disclosed herein are limited to these descriptions, other words may be used in the description or claims to describe a similar member and/or feature, and these element numbers can be described by other words that would be understood by a person of ordinary skill reading and reviewing this disclosure in its entirety.

TABLE 1

| 100 | imaging system (e.g., mechanical streaking-based lifetime imaging system) |
| 105 | light source (e.g., laser) |
| 106 | optical beam (e.g., laser beam) |
| 110 | detector (e.g., camera) |
| 120 | scanning mirror (e.g., a galvo scanner with a rotating reflective surface) |
| 130 | processor |
| 140 | focusing lens (e.g., cylindrical lens) |
| 142 | relay lens (e.g., telecentric relay lens) |
| 144 | relay lens (e.g., telecentric relay lens) |
| 146 | relay lens (e.g., telecentric relay lens) |
| 150 | filter (e.g., long-pass filter) |
| 155 | mirror (e.g., dichroic mirror) |
| 160 | slit |

TABLE 1-continued

| 165 | sample platform (e.g., piezo stage) |
| 170 | lens (e.g., objective lens) |
| 190 | sample |
| 201 | streak line |
| 812 | communication interfaces |
| 814 | system circuitry |
| 816 | processor |
| 818 | user interface |
| 820 | memory |
| 828 | input interfaces |

What is claimed is:

1. A system for phosphorescence lifetime imaging based on mechanical streaking, the system comprising:
a light source configured to excite phosphorescence emission;
a camera configured to receive the phosphorescence emission from a sample in response to the source emission;
a slit;
a scanning mirror in view of the light source, the camera, and the slit, the scanning mirror configured to reflect the phosphorescence emission passing back through the slit to the camera; and
a processor configured to:
convert pixel position to time,
perform exponential curve fitting to the recorded streak image,
return decay lifetime numbers related to the recorded streak image, and
perform said convert, perform and return features for each streak line and reduce a 2D streak image into a 1D phosphorescence lifetime image.

2. The system of claim 1, wherein the scanner comprises a galvanometer scanner.

3. The system of claim 1, wherein the camera comprises a scientific complementary metal-oxide-semiconductor (sCMOS) camera.

4. The system of claim 1, wherein the light source comprises a pulsed laser.

5. The system of claim 1, wherein the light source comprises a continuous wave laser.

6. The system of claim 1, wherein the system is configured for confocal line scanning.

7. The system of claim 1, wherein the system is configured for line scanning light sheet imaging.

8. The system of claim 1, wherein said processor is configured to color code each of the decay lifetime numbers for each pixel position and present the decay lifetime numbers as a 2D presentation of the pixel position and an additional (third) dimension of the color of each pixel position.

9. The system of claim 8, wherein:
the scanner comprises a galvanometer scanner;
the light source comprises a pulsed laser; and
the camera comprises a scientific complementary metal-oxide-semiconductor (sCMOS) camera.

10. A method, comprising:
directing a laser beam toward a first target location of a sample;
exciting the first target location with the laser;
receiving light energy from the first target location with a detector, the light energy being indicative of the excitation level of the first target location;
creating streak lines indicative of the time-dependent decrease in light energy due to an excitation decay of the first target location;

determining a representative decay time for the streak line;

assigning a color to the representative decay time; and presenting the decay time on a 2D plot representative of the location of the first target location on the sample and color coded depicting the decay time.

11. The method of claim 10, wherein said directing includes reflecting the laser beam off the reflective surface of a galvanometer scanner.

12. The method of claim 10, wherein said directing includes passing the laser beam through a slit.

13. The method of claim 10, wherein said directing includes passing the laser beam through at least one telecentric relay lenses.

14. The method of claim 10, comprising:

exciting the first target location with the laser a second time;

receiving light energy from the first target location with a detector a second time, the light energy being indicative of the excitation level of the first target location after the second excitation;

creating streak lines indicative of the time-dependent decrease in light energy due to the excitation decay of the first target location after the second excitation; and combining the streak lines for the first and second excitations;

wherein said determining a representative decay time includes determining a representative decay time for the streak lines generated after the first and second excitations;

wherein said assigning a color includes assigning a color to the representative decay time for the streak lines generated after the first and second excitations; and wherein said presenting the decay time includes presenting the decay time on a 2D plot representative of the location of the first target location on the sample and color coded depicting the decay time for the streak lines generated after the first and second excitations.

15. The method of claim 10, comprising:

directing a laser beam toward a second target location of a sample;

exciting the second target location with the laser;

receiving light energy from the second target location with a detector, the light energy being indicative of the excitation level of the second target location;

creating streak lines indicative of the time-dependent decrease in light energy due to the excitation decay of the second target location;

determining a representative decay time for the streak line;

assigning a color to the representative decay time, similar colors correlating to similar decay times; and presenting the decay time on a 2D plot representative of the location of the second target location on the sample and color coded depicting the decay time.

16. The method of claim 15, wherein:

said directing a laser beam toward a first target and said directing a laser beam toward a second target includes reflecting the laser beam off the reflective surface of a galvanometer scanner; and said directing a laser beam toward a first target location of a sample and said directing a laser beam toward a second target location of a sample include passing the laser beam through a slit and at least one telecentric relay lens.

17. The system of claim 15, wherein said means for directing energy includes a galvanometer scanner.

18. The system of claim 15, wherein said means for directing energy includes at least one telecentric lens and a slit.

19. The system of claim 15, wherein said means for converting includes:

creating streak lines indicative of the time-dependent decrease in light energy due to the excitation decay for each of the plurality of target location;

determining a representative decay time for each of the streak lines;

assigning similar colors to similar representative decay times for each of the plurality of target locations; and presenting the decay time of each of the plurality of target locations on a plot that represents the physical location of each target location and the color depicting the decay time associated with each of the plurality of target locations.

20. A system, comprising:

a laser light source;

a scanner configured to direct a light beam generated by the laser light source in a first direction along a laser beam pathway to a plurality of target locations on a sample;

means for directing energy indicative of the target decay of the plurality of target locations following illumination by the laser beam in a second direction opposite the first direction along at least a portion of the laser beam pathway;

a detector configured to receive the energy indicative of the target decay of the plurality of target locations;

means for converting the energy indicative of the target decay of the plurality of target locations and received by the detector into a representation for each target location of the sample reflecting the location of each target location on the sample and the decay time associated with each target location on the sample.

* * * * *